United States Patent Office 2,820,050
Patented Jan. 14, 1958

2,820,050

SUBSTITUTED PROPIONITRILES AND PREPARATION OF THE SAME

Martin E. Hultquist, Boulder, Colo., assignor to American Cyanamid Company, New York, N. Y., a corporation of Maine No Drawing. Application July 22, 1955
Serial No. 523,927

8 Claims. (Cl. 260—465)

This invention relates to new organic compounds. More particularly it relates to substituted propionitriles and a method of preparing the same.

Thiamin (vitamin $B_1$) was synthesized in 1936 by Williams (J. A. C. S. 58, 1063). It is generally prepared and used in the form of one of its salts and as the hydrochloride has the chemical name 3-(4-amino-2-methylpyrimidyl - 5 - methyl) - 4 - methyl - 5 - $\beta$ - hydroxyethylthiazolium chloride hydrochloride and the structural formula

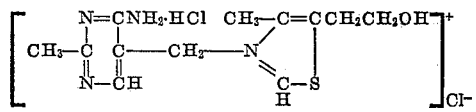

In synthesizing thiamin the pyrimidine portion of the compound is usually condensed with the thiazole portion. In the past the pyrimidine portion of the compound has been prepared with a cyano group in the 5-position [Grewe, Z. Physiol. Chem. 242, 89 (1936)] or with an alkoxymethyl group in the same position [Garvin, J. Applied Chem. USSR 16, 105–17 (1943)]. In order to obtain the desired aminomethyl group in the 5-position in the former method, catalytic hydrogenation is necessary, whereas in the latter method halogenation and amination is necessary. Both of these methods present certain difficulties from a commercial standpoint, and it is therefore desirable that an intermediate be found which when condensed with acetamidine will produce the desired pyrimidine with an aminomethyl or substituted aminomethyl group in the 5-position, which on simple hydrolysis is convertible to aminomethyl.

It has now been found that when certain N-substituted formylaminopropionitriles are reacted with a dialkyl sulfate and subsequently condensed with acetamidine, the desired pyrimidines are produced. The formylaminopropionitriles of the present invention have the following general formula:

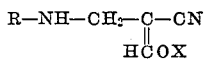

in which R is a member of the group consisting of aliphatic acyl and aroyl radicals and X is an alkali metal radical.

The compounds of the present invention are crystalline solids somewhat soluble in water and slightly soluble in the usual organic solvents.

The compounds of the present invention are prepared by reacting an aliphatic acyl or aroyl aminopropionitrile with a lower aliphatic ester of formic acid and an alkali metal alcoholate. The intermediates used in the process comprise compounds such as acetamidopropionitrile, propionamidopropionitrile, butyramidopropionitrile, benzamidopropionitrile, and the like.

The present compounds are prepared by mixing the substituted aminopropionitrile with the lower alkyl ester of formic acid followed by the addition of the alkali metal alcoholate. The temperature during the course of the initial reaction is preferably maintained within the range of $-10°$ C.–$30°$ C. The reaction mixture is then heated under pressure to a temperature of from 70 to $100°$ C. for a period of thirty minutes to several hours. Following completion of the reaction, the mixture is diluted with an organic anhydrous solvent, such as ethanol, or a mixture of anhydrous solvents, such as anhydrous ethanol and anhydrous ether. The product precipitates and is removed by filtration. It is usually not necessary to further purify the product before condensing it with acetamidine to produce the substituted pyrimidine. However, should a purer product be desired, it can be obtained by recrystallization.

The condensation of the N-substituted formyl aminopropionitrile with acetamidine is described hereinafter in the examples. The method of preparing substituted pyrimidines using the compounds of the present invention as one of the intermediates is disclosed in our copending application, Serial No. 523,933, filed July 22, 1955.

The following examples illustrate the preparation of the compounds of the present invention in greater particularity.

EXAMPLE 1

*Sodium salt of alpha-formyl-beta-acetamidopropionitrile*

A mixture of 33.6 parts (0.3 mole) beta-acetamidopropionitrile and 20 parts (0.25 mole) of methyl formate is cooled to $-5°$ C. To this resulting slurry is added 12 parts (0.33 mole) of sodium methylate with stirring and cooling to maintain a temperature of $0$–$10°$ C. The slightly turbid colorless syrup is placed in a bomb tube, sealed and heated to $70°$ C. for three hours. On cooling and standing overnight, the material crystallizes to a yellow mush. The tube is opened, filtered and the crystals washed with anhydrous alcohol and then with alcohol and ether. On drying, there is obtained 15 parts of a light yellow powder.

EXAMPLE 2

*Sodium salt of alpha-formyl-beta-acetamidopropionitrile*

246 parts of beta-acetamidopropionitrile is warmed on a steam bath until melted, and 187 parts of ethyl formate is added. The solution is cooled to $-5°$ C., and 130 parts of sodium methylate is added over a 30-minute period, maintaining the temperature at $0°$ to $10°$ C. The turbid solution is charged to a steel bomb and heated in the autoclave to $70°$ C. over a 1 hour period, then held at $70°$ C. for four hours. The reaction mixture is removed from the steel bomb and diluted with 500 parts anhydrous ethanol, and 600 parts anhydrous ether added. The product is filtered, washed with ether, and dried in the vacuum desiccator. Yield 41.3% (147 parts).

EXAMPLE 3

*Sodium salt of alpha-formyl-beta-benzamidopropionitrile*

A mixture of 48.5 parts (0.28 mole) of beta-benzamidopropionitrile, 24.2 parts (0.3 mole) of ethyl formate and 265 parts of toluene is cooled to $10°$ C. To the resulting slurry is added 16 parts (0.3 mole) of sodium methylate with stirring and cooling to maintain the temperature at $10°$ C. The mixture is placed in a stainless steel autoclave, sealed and heated at $70°$ C. for four hours. After cooling and agitating overnight, the autoclave is opened and the supernatant toluene decanted. The light yellow syrup residue is dissolved in 335 parts of ethanol. Addition of 1400 parts of ether precipitates a white solid which is isolated by filtration, washed with ether and dried in a vacuum desiccator. There is obtained 8.6 parts of product.

EXAMPLE 4

2-methyl-4-amino-5-acetamidomethyl pyrimidine

To a slurry of 75 parts (0.46 mole) of sodium alpha-formyl-beta-acetamidopropionitrile in 200 parts of anhydrous ethanol is added 75 parts (0.5 mole) of diethyl sulfate. On heating to reflux at 75° C. the heat of reaction is sufficient to keep the mixture at a gentle boil for 10–15 minutes. At the end of this time, the material is almost entirely in solution. After 15 minutes at reflux, the mixture is cooled to 40° C., 200 parts of anhydrous ether is added and the sodium ethyl sulfate is filtered off. During the time that this reaction is being carried out, a solution of acetamidine base is prepared by treating a solution of 47 parts (0.5 mole) of acetamidine hydrochloride in 150 parts of anhydrous ethanol with 27 parts (0.5 mole) of sodium methylate and filtering to remove the sodium chloride. The acetamidine base solution is then combined with the alpha-ethoxy-methylene beta-acetamidopropionitrile and evaporated under reduced pressure to a heavy syrup with a maximum internal temperature of 45° C. After standing overnight, a small amount of impurity is filtered off and the syrupy filtrate is diluted with 200 parts of anhydrous ethanol. Dry hydrogen chloride is added to saturate the solution with hydrogen chloride at 40–50° C. On standing for 1–2 hours, the heavy crystalline precipitate is filtered, washed with ethanol and dried. There is obtained 34 parts of a hydrochloride which is converted to the picrate in water, and the picrate is then slurried in 200 parts of anhydrous ethanol. Dry hydrogen chloride is added to saturate the mixture at 50° C., and after cooling to 20° C., filtering and washing with anhydrous ethanol, there is obtained a dihydrochloride. This is purified by dissolving in 20 parts of water, adding sodium hydroxide solution to bring to a pH of about 4 and evaporating to dryness. This monohydrochloride is recrystallized from about 100 parts of hot, anhydrous ethanol to give 6.3 parts of 2-methyl-4-amino-5-acetamidomethylpyrimidine hydrochloride.

The hydrochloride of the above compound is converted to the 2-methyl-4-amino-5-acetamidomethylpyrimidine by the followeing procedure: 2 parts of 2-methyl-4-amino-5-acetamidomethylpyrimidine hydrochloride is dissolved in 9.4 parts of normal sodium hydroxide and evaporated to dryness under reduced pressure. The residue is then dissolved in anhydrous ethanol, filtered to remove salt, and cooled to crystallize. It is then recrystallized twice from a small amount of anhydrous ethanol. There is obtained 0.6 part, melting at 204–206° C. It shows no depression of melting point when mixed with authentic 2-methyl-4-amino-5-acetamidomethylpyrimidine prepared by acetylation of 2-methyl-4-amino-5-aminomethylpyrimidine. It is converted to thiamin by the procedure described in the literature (Burger, vol. 1, page 519).

I claim:

1. A compound having the general formula

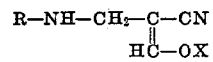

in which R is a member of the group consisting of lower alkanoyl and benzoyl radicals and X is an alkali metal radical.

2. An alkali metal salt of alpha-formyl-beta-acetamidopropionitrile.

3. Sodium salt of alpha-formyl-beta-acetamidopropionitrile.

4. Sodium salt of alpha-formyl-beta-benzamidopropionitrile.

5. A method of preparing compounds having the general formula

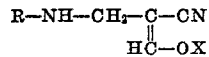

in which R is a member of the group consisting of lower alkanoyl and benzoyl radicals and X is an alkali metal radical which comprises reacting a member of the group consisting of beta-lower alkanoylaminopropionitriles and beta-benzoylaminopropionitriles with a lower alkyl ester of formic acid and an alkali metal alcoholate.

6. A method of preparing an alkali metal salt of alpha-formyl-beta-acetamidopropionitrile which comprises reacting beta-acetamidopropionitrile with a lower alkyl ester of formic acid in the presence of an alkali metal alcoholate.

7. A method of preparing the sodium salt of alpha-formyl-beta-acetamidopropionitrile which comprises reacting beta-acetamidopropionitrile with a lower alkyl ester of formic acid in the presence of sodium alcoholate.

8. A method of preparing the sodium salt of alpha-formyl-beta-benzamidopropionitrile which comprises reacting beta-benzamidopropionitrile with a lower alkyl ester of formic acid in the presence of sodium alcoholate.

References Cited in the file of this patent

UNITED STATES PATENTS

| | | |
|---|---|---|
| 2,278,549 | Loder | Apr. 7, 1942 |
| 2,461,842 | Olin | Feb. 15, 1949 |
| 2,480,683 | Stiller | Aug. 30, 1949 |
| 2,489,927 | Pfister et al. | Nov. 29, 1949 |

FOREIGN PATENTS

| | | |
|---|---|---|
| 475,559 | Great Britain | Nov. 19, 1937 |

OTHER REFERENCES

Migrdichian: Organic Cyanogen Compounds (1947), p. 280.